(12) United States Patent
Rodriguez

(10) Patent No.: US 10,929,496 B1
(45) Date of Patent: Feb. 23, 2021

(54) ACTIVATE A CROSS BROWSER PLATFORM TO ENABLE INTERFACES

(71) Applicant: Lazaro Rodriguez, Hialeah, FL (US)

(72) Inventor: Lazaro Rodriguez, Hialeah, FL (US)

(*) Notice: Subject to any disclaimer, the term of this patent is extended or adjusted under 35 U.S.C. 154(b) by 262 days.

(21) Appl. No.: 16/039,270

(22) Filed: Jul. 18, 2018

Related U.S. Application Data

(63) Continuation-in-part of application No. 14/196,466, filed on Mar. 4, 2014, now abandoned.

(60) Provisional application No. 61/748,174, filed on Jan. 2, 2013.

(51) Int. Cl.

| | |
|---|---|
| *G06F 16/00* | (2019.01) |
| *G06F 16/957* | (2019.01) |
| *G06F 3/0482* | (2013.01) |
| *G06Q 50/18* | (2012.01) |
| *G06F 16/93* | (2019.01) |
| *G06F 16/958* | (2019.01) |

(52) U.S. Cl.
CPC ........ *G06F 16/9577* (2019.01); *G06F 3/0482* (2013.01); *G06F 16/93* (2019.01); *G06F 16/986* (2019.01); *G06Q 50/18* (2013.01)

(58) Field of Classification Search
None
See application file for complete search history.

(56) References Cited

U.S. PATENT DOCUMENTS

| | | | | |
|---|---|---|---|---|
| 6,533,385 B1* | 3/2003 | Mackay | ................ | B41J 29/393 347/14 |
| 2003/0055701 A1* | 3/2003 | Dutta | ................... | G06Q 30/02 705/1.1 |
| 2003/0125981 A1* | 7/2003 | Pedrazzoli Pazos | .. | G06Q 10/10 705/34 |
| 2005/0231387 A1* | 10/2005 | Markelz | ............... | B61L 23/041 340/937 |
| 2011/0161090 A1* | 6/2011 | Tilton | ................... | G06Q 10/06 705/1.1 |

OTHER PUBLICATIONS https://web.archive.org/web/20110808143148/http://www.miami-dadeclerk.com/spirit_overview.asp (Year: 2011).*
https://web.archive.org/web/20030416170743/http://www.epay-it.com/default.asp (Year: 2003).*
https://web.archive.org/web/20120510221001/https://services.cookcountyclerkofcourt.org/TrafficTickets/Default.aspx (Year: 2012).*

* cited by examiner

*Primary Examiner* — Kambiz Abdi
*Assistant Examiner* — Christopher Stroud

(57) ABSTRACT

A cross-browser dialog platform is made available for enabling hosted web pages in a dialog to post the payment under the right category code and pay class for the submission and verification of documentary evidence to satisfy at least one outstanding citation. The web page may be utilized inside or outside the dialog. Select elements on the hosted page may be hidden when in a dialog and invoked behavior from an input or request may be specified for hyperlinks inside or outside the dialog, and at the same time displaying the proper size of the dialog for computing device.

1 Claim, 9 Drawing Sheets

| Browsing Application |
|---|
| Www.payfloridacitations.com |
| File  View  Format  Edit  Tools  Help |
| Web Dialog | Databases | Shared Pages |

Web Dialog

| New | Actions | Configuration |
|---|---|---|

Sync | Wrap Around | Copy | Download | Email| Payment Type | Category| All Cases| Select Cases | API

| Case Type/No. | Accepted | Dismissed | Pay Amount/ |
|---|---|---|---|
| Citation No. | Documents Verified | Yes | Category $10/Valid |

FIG 4 A

ACTIVATE A CROSS BROWSER PLATFORM TO ENABLE INTERFACES

OTHER RELATED APPLICATIONS

The present application is a continuation-in-part of U.S. patent application Ser. No. 14/196,466, filed on Mar. 4, 2014, which is hereby incorporated by reference. U.S. patent application Ser. No. 14/196,466 is the parent application of provisional application 61/748,174 filed on Jan. 2, 2013 that is also incorporated by reference.

BACKGROUND OF THE INVENTION

1. Field of the Invention

The present invention relates to a system that enables a cross-browser dialog platform for the submission and verification of documentary evidence to satisfy at least one outstanding citation.

2. Description of the Related Art

Several designs for cross-browser dialog platforms have been designed in the past. Nona of them, however, include a system using submission and verification of documentary evidence to satisfy at least one outstanding citation or to satisfy the safety requirements of a vehicle to be operational that when verified through a Dots Per Inch Requirement using vehicle or government color placards through a network protocols for the minimum or least amount of bandwidth for clarity, a web dialog composites a new web page to enable to process. For example, to process the payment under the right category code and pay class and presenting a new web page within the dialog to be able to synchronize the database with an agency database. The agency database is associated with at least one of a state, city, county; or government jurisdiction.

3. Description of Background

Also, operating systems and their browsers like but not limited to Microsoft Windows Edge browser can require a user to download an application from their approved store. If a computing device is not updated with previous updates, the computing device can have trouble presenting a graphical user interface's and its capabilities, pops ups, functions, colors, graphics, texts, etc.

Government jurisdictions have a break down in communications within their departments in synchronizing databases for requirements associated with at least one violation to satisfy the citation or the safety requirements for a vehicle.

As the automation and driver-less vehicle continue to progress. There will be a system needed to process and verify the safety requirements of a vehicle directly into the database, operating system, client program, of an automated driver less-vehicle. It will be understood that this example of a driver-less is not limited to a vehicle with the capabilities of an individual taking control of the vehicle.

Government jurisdictions have many different databases within their own departments at County, Clerks, Collections, Courts, Traffic Tickets, Police Departments, Service Locations, etc. None of them have a way to process information in constant manner with a user's computing device if but not limited to the computing device that is being used is missing updates, is no longer receiving updates from an operating system or manufacture to receive documentation required to satisfy the citation and update the current status for at least one of a driver license, registration, insurance, or proof of compliant equipment in one central place to synchronizing databases for all the government jurisdictions in a state or country.

Government jurisdictions do not have the resources or economic means to create their own systems and technologies to keep with the constant updates of computing devices. States and local governments have outdated technologies that is not able to process different types of files so users are limited which computing devices or computer programs they can use to satisfy their citation. For example, their technologies might not be compatible on a smart phone, tablet, smart watch, and near-field communications, process all image document types, accept payment from different providers, process information in their existing case management system, etc. For example a lot of case management systems can only process and accept a PDF document or a TIFF format. A lot of case management systems require that you send executable program in a certain amount of bits to a decompiler to process information in a case management system.

Government jurisdictions within one sector may have one database for payments, a different database to store images, a different database for the Judges and courts. So, if one department wanted to sync with another, they would have to create an interface and a web dialog to wrap around another web dialog. Many government jurisdictions and agencies do not have the resources and economic means to create an interface web application, web app view, or web dialog every time a new technology emerges to satisfy requirements associated with a citation.

Laws or court decisions for a specific case/citation are constantly changing requiring different payment amounts for citations, late fees, court fees, etc. Every time there is a change in Laws or fees, government jurisdiction's departments have to get approval to implement new projects to update systems and departments. So, departments have to wait to improve efficiency.

Many government jurisdictions and agencies do not have the resources and economic means to allow new technologies an interface to connect to synchronize agency databases there limiting growth in the community with businesses, putting them at a disadvantage with other counties, not being able to collect funds efficiently, etc.

A lot of employees within a government jurisdiction use different web browsers or outdated web browsers because of budget cuts, no tech department, outdated technologies like case management systems. Employees in different departments do not have the means to update, enable, or process other department interfaces for satisfy citations in a consistent manner for communication for interfaces or deploy new technologies within existing interfaces. A lot of systems can create confusion if too many options are available for a particular citation to be satisfied. A user can click on the wrong category or allocation code creating an inappropriate dollar might to be paid or to synchronize to the wrong agency database. These scenarios can cause a lot of problems to a user not being able to use their vehicle or a government agency not being able to collect the correct fine amount or overcharging a user/customer.

Many instances happen where an individual in a court proceeding presents requirements regarding a citation or the safety of a vehicle, and a court process information but that information does not reflect in a timely manner to be paid and synchronize an agency database. Also, the opposite can happen where a court proceeding is not able to access the updated requirements submitted by a user, computing device, computing mechanism, operating system, or client program. Therefore, a court proceeding might have to be delayed or additional court fees may be applied.

It could be very expensive for government agencies to but not limited to in trying to keep up with new technologies, assigning employee roles, allocating payment codes, categories for agency databases, etc.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a cross-browser dialog platform that supports the location and enablement of sub-contents by hosting web pages in a dialog, such that a web page may be used inside or outside a dialog to submit, verify, manipulate, and synchronize of a vehicle documentary object. According to some embodiments select elements on the hosted page may be hidden when in a dialog and invoked behavior from an input or request may be specified for hyperlinks inside or outside the dialog, and at the same time displaying the proper size of the dialog for computing device. According to some embodiments an operating system program can be executed to locate a content within a database to be displayed in the web page and dialog.

Embodiments are directed to a cross-browser dialog platform that supports hosting web pages in a dialog, such that a web page may be used inside or outside a dialog to enable interfaces to process the submission and verification of documentary evidence to satisfy at least one outstanding citation and vehicle safety requirement to post the payment under the right category code and pay class. According to some embodiments select elements on the hosted page may be hidden when in a dialog and invoked behavior from an input or request may be specified for hyperlinks inside or outside the dialog, and at the same time displaying the proper size of the dialog for computing device.

Embodiments are directed to a cross-browser Web app view platform that supports the location and enablement of sub-contents by hosting web pages in a web app view, such that a web page may be used inside or outside a web app view to submit, verify, manipulate, and synchronize of a vehicle documentary object. According to some embodiments select elements on the hosted page may be hidden when in a web app view and invoked behavior from an input or request may be specified for hyperlinks inside or outside the web app view, and at the same time displaying the proper size of the web app view for computing device. According to some embodiments an operating system program can be executed to locate a content within a database to be displayed in the web page and web app view.

Embodiments are directed to a cross-browser web app view platform that supports hosting web pages in a web app view, such that a web page may be used inside or outside a web app view to enable interfaces to process the submission and verification of documentary evidence to satisfy at least one outstanding citation and vehicle safety requirement to post the payment under the right category code and pay class. According to some embodiments select elements on the hosted page may be hidden when in a web app view and invoked behavior from an input or request may be specified for hyperlinks inside or outside the web app view, and at the same time displaying the proper size of the web app view for computing device.

Embodiments are directed to a cross-browser a web app view or dialog platform that supports a controller containing at least one memory said memory containing an operation system. Further embodiment includes said memory containing a client program. According to some embodiments operating system and client program being a secure web browser that communicates with a microcontroller or microprocessor hosted within web app view or dialog. The memory stores authentication information including but not limited to password, encrypted key, certificate, endpoint information in controller or database. According to some embodiments a controller having the ability to send instruction to secure web browser to terminate session when time stamps generated by encryption program is outside of a predetermined time frame. Also, to continuously verify a user included but not limited to time stamps. Secure web browser being includes but not limited to an exe file, script within browser, javascript, html, css, c++, java, etc.

Embodiments are directed to a cross-browser a web app view or a dialog platform that supports a secure web browser that communicates with a vehicle documentary object and synchronize an agency database or government jurisdiction. Agency database and Government Jurisdiction database include but not limited to a city and state.

Embodiments are directed to a cross-browser a web app view or a dialog platform that supports checking the Dots Per Inch (DPI) for clarity for the requirement for an image to synchronize a database. The checking of the clarity includes but not limited to running a program of a hosted web page or program in the web app view or dialog sub-contents. The checking of the clarity includes but not limited using the sensors on a device. The sensors include but not limited to accelerometer, gyroscope, magnetometer, and GPS. The checking of the clarity includes but not limited the user holding the vehicle documentary object in different behavior positions to capture holograms, seals, certificates, branding information that makes the vehicle documentary valid with a government jurisdiction. For example, the web application may require the user to hold the vehicle documentary in a certain angle and using the sensors of a device to confirm angle and lighting. Angles can include but not limited to 90 degrees, compass direction, measuring distance from device and document. Lighting includes but not limited using the property record of a property to review the architecture of structure to guide the person in terms of squarefeet to the appropriate window, lightfixture, bedroom light, kitchen light, etc. at a certain time of the day. To guide the customer, the web application can run a camera sensor function, exe, java, javascript html, script from browser, html, xml, css, json schema, xml schema. Running a program hosted on the web page to be able to check for clarity can include but not limited to a program within or a third party.

Embodiments are directed to a cross-browser dialog platform that supports the location and enablement of sub-contents by hosting web pages in a dialog or web app view, such that a web page may be used inside or outside a dialog or web dialog to submit, verify manipulate, and synchronize of a vehicle documentary object. At the same time displaying the appropriate graphical user interface to an authorised user. For example, if the vehicle documentary is related to Driver License display in the sub-contents programs to check holograms, DPI, valid with a state, city, or government jurisdiction database. For example if the vehicle documentary is related to insurance and tag/registration, there may be no need to display sub-contents to check holograms. For example if the vehicle documentary is related to improper equipment, there may be no need to display an affidavit or document similar to an affidavit, generate a notarization program or link. Each GUI can be predetermined which government jurisdiction data base to be synchronized with or determined by an authorized user. By displaying the appropriate GUI for authorized user, reduces the risk of error, allocating the incorrect pay class and category for a system or case management system.

Embodiments are directed to a cross-browser dialog platform that supports the location and enablement of sub-contents by hosting web pages in a dialog or web app view, such that a web page may be used inside or outside a dialog or web dialog to submit, verify, manipulate, and synchronize of a vehicle documentary object. At the same time displaying the appropriate graphical user interface to an authorized user. The GUI can allow one authorized user or multiple users at one time. The GUI can inform the users who is currently viewing and editing information. There can be permissions set for each authorized user.

Embodiments are directed to a cross-browser dialog platform that supports the location and enablement of sub-contents by hosting web pages in a dialog or web app view, such that a web page may be used inside or outside a dialog or web dialog to submit, verify, manipulate, and synchronize of a vehicle documentary object through include but not limited to near-field communication, biometrics, and Bluetooth. NFC allows an authorized user, for example a police officer to submit and verify vehicle documentary object for safely or to satisfy requirements for a citation on the road, office or particular location. Using these types of connection to instruct a user to use web application and authorizing police officer to use platform.

Embodiments are directed to a cross-browser dialog platform that supports the location and enablement of sub-contents by hosting web pages in a dialog or web app view, such that a web page may be used inside or outside a dialog or web dialog to submit, verify, manipulate, and synchronize of a vehicle documentary object through include but not limited using an operating system program or client program inside a vehicle to transmit performance safety scan and transmitting that information directly to platform when a web application is opened using a device within a vehicle or a device associated with that vehicle by a user. The device includes but not limited to a computing device. The user's device may or may not be associated with vehicle. If user device not associated includes but not limited by a means for authorizing can be generated by user of that vehicle, push notifications, biometrics, nfc, Bluetooth, etc.

Embodiments are directed to a cross-browser dialog platform that supports the location and enablement of sub-contents by hosting web pages in a dialog or web app view, such that a web page may be used inside or outside a dialog or web dialog to submit, verify, manipulate, and synchronize of a vehicle documentary object through include but not limited to a host data replicator to copy relational data between the mainframe and the SQL, Linux, server database. It could also be used to create a secure VPN connection. Includes but not limited to unixODBC Project, setting up a linux or UNIX environment, display database command, DB2 databases, table spaces, XML table spaces, LOB table spaces, Index spaces within a database, Indexes on auxiliary tables, Partitions of partitioned table spaces, Partitions of index spaces.

All Embodiments: According to some Embodiments select elements on the hosted page may be hidden when in a dialog and invoked behavior from an input or request may be specified for hyperlinks inside or outside the dialog, and at the same time displaying the proper size of the dialog for computing device.

Embodiments are directed to a cross-browser dialog platform that supports the location and enablement of sub-contents by hosting web pages in a dialog or web app view, such that a web page may be used inside or onside a dialog or web dialog to submit, verify, manipulate, and synchronize of a vehicle documentary object through include but not limited to satisfy the requirements for a citation.

Embodiments are directed to a cross-browser dialog platform that supports the location and enablement of sub-contents by hosting web pages in a dialog or web app view, such that a web page may be used inside or outside a dialog or web dialog to submit, verify, manipulate, and synchronize of a vehicle documentary object through include but not limited to satisfy the requirements of a driverless vehicle.

Embodiments are directed to a cross-browser dialog platform that supports the location and enablement of sub-contents by hosting web pages in a dialog or web app view, such that a web page may be used inside or outside a dialog or web dialog to specifying separate behaviors for the links includes: defining the separate behaviors based on one of: a markup language attribute for each link and a parameter on each link's query string. on page load of the web page, iterating through anchor tags on the web page to determine links with a relevant one of a markup language attribute and a query string key; and modifying one of the markup language attribute and the parameter for each of the links on the web page to employ a dialog-specific behavior when selected.

Embodiments are directed to a cross-browser dialog platform that supports the location and enablement of sub-contents by hosting web pages in a dialog or web app view, such that a web page may be used inside or outside a dialog or web dialog to specifying separate behaviors for the links includes: defining the separate behaviors based on one of: a Dots Per Inch attribute for each link and document object model parameter on each link's query string. on page load of the web page, iterating through anchor tags on the web page to determine links with a relevant one of a markup language attribute and a query string key; and modifying one of the markup language attribute and the parameter for each of the links on the web page to employ a dialog-specific behavior when selected.

Embodiments are directed to a cross-browser dialog platform that supports the location and enablement of sub-contents by hosting web pages in a dialog or web app view, such that a web page may be used inside or outside a dialog or web dialog to specifying separate behaviors for the links includes and to serve the compost of a new web page based on vehicle object with activation based on color placards through assessing visual acuity using a video image of a optotype chart obtained with the standard focal length and aperture of computing device and compare the remote images transmitted using various bandwidths and connection protocols.

The invention is a system and method for measuring visual acuity. The system comprises a computer or a projector adapted to project a computer generated image of an optotype on a surface, e.g. a computer display screen or a screen on a wall at any custom distance, fixed distance, or an automated distance.

The projector comprises a zoom lens that enables continuous digital or optical zoom in the range of 20× or standard, or non standard. The projector is adapted to allow the operator to select the rate at which the zoom will automatically change in either a linear or logarithmic manner. The direction of the change of the zoom can be from the largest size of the optotype to the smallest or vice versa. The optotypes are constructed according to Snellen standards or Visual Standards and can be in any form, e.g. numerals, images, emojis, or letters in any language or symbols. However since the Hindu-Arabic numerals (0, 1, 2, 3, 4, 5, 6, 7, 8, 9) are familiar to almost every person in the world as evidenced by their appearance on the bank notes of most countries, their use as optotypes are suggested.

The computing device comprises a zoom lens that enables continuous digital or optical zoom in the range of 20× or standard. Includes but not limited to: standard or non standard focal length and aperture of computing device; The projector is adapted to allow the operator to select the rate at which the zoom will automatically change in either a linear or logarithmic manner. The direction of the change of the zoom can be from the largest size of the optotype to the smallest or vice versa. The optotypes are constructed according to Snellen standards or Visual Standards and can be in any form, e.g. numerals, images, emojis, or letters in any language or symbols. However since the Hindu-Arabic numerals (0, 1, 2, 3, 4, 5, 6, 7, 8, 9) are familiar to almost every person in the world as evidenced by their appearance on the bank notes of most countries, their use as optotypes are suggested.

It is also noted that the optotypes can also be displayed to the client using a computer and computer, television, or similar display screen as long as the computer is programmed to continuously vary the size of the optotype at a known rate and not to display a series of optotypes with different sizes in a "staircase" manner or limited manner.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform", "Composite", "Look and Feel" may be a combination of software and hardware components for managing computer and network operations, which may provide web applications with hosted web pages and dialog interactions. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

While the embodiments will be described in the general context of program modulo, color placards, bandwidth protocols, vehicle safety standards, vehicle citation compliance documents or documents, that execute in conjunction with an application program that runs on an operating system on a personal computer, those skilled in the art will recognize that aspects may also be implemented in combination with other program modules.

The placards or placards included but not limited to government traffic signs, posters, graphics, computer graphics, non government generated placards instead private companies placards placed on vehicles, signs, posters, computing devices, etc. Placards can be in the standard colors for hazards blue, yellow, green, and red, or can be in custom colors, or automated generated colors banded on a user experience, website, application, and computing device. Placard images can be used with the lighting of a property layout or without a property layout directed by computing device to take a picture of an object by asking a user to first take a picture of an image inside or outside property and use the lighting to compare images for transmission protocols instead of images stored remotely, local, or cloud. Then, update data store, database, server with images taken by a user to compare and serve composite web site, dialog, web appview, web application, application.

All Embodiments: According to some embodiments can be generally understood with the scope of the invention without placing limitations thereon.

All Embodiments: According to some Embodiments includes but not limited to all embodiments described.

All Embodiments: According to some Embodiments include but not limited to activating a link and serving a composite look and feel description of a data store based on the vehicle citation and safety documentation object associated with the least bandwidth possible while retaining clarity through color placards, assessing visual acuity using a video image of a optotype chart with focal length and aperture.

All Embodiments: According to some Embodiments of objects of the invention will be brought out from the following detailed description and a review of the associated drawings. It is for the purpose of fully disclosing the invention without placing limitations thereon.

All Embodiments: According to some Embodiments include but not limited to a server for providing a web application executing a script within a cross-browser web dialog platform.

All Embodiments: According to some Embodiments include but not limited to java, javascript, script within browser, executable program, operating system program, secure web browser, css, json schema, xml schema, object oriented model, and document object oriented model.

Further objects of the invention will be brought out from the following detailed description and a review of the associated drawings. It is for the purpose of fully disclosing the invention without placing limitations thereon.

All Embodiments: According to all or some embodiments included to but not limited to all of this document, description, claims, summary, drawings, detailed description thereon.

All Embodiments or According to some embodiments having instructions to terminate or turn off automatically a serve a composite web page activation if clarity, placards, protocols, or vehicle object is not obtained includes but not limited to a executable program, encryption program, secure web browser, scripting within browser, script within dialog, or script within new web page, from a hosted web page, contents, or sub-contents inside dialog, web app view, web site, and web application.

All Embodiments or According to some embodiments having instructions to continue automatically to serve a composite web page activation if clarity, placards, protocols, or vehicle object, is not obtained includes but not limited to a executable program, encryption program, secure web browser, scripting within browser, script within dialog, or script within new web page, from a hosted web page, contents, or sub-contents inside dialog, web app view, web site, and web application.

All embodiments or According to some embodiments of allowing the continuation to serve a composite website or activation or termination of a composite website, dialog, web app view, web application, can have the capabilities to receive placards from a certain time designed by web application, web app view, or dialog or by a third party that has an API, Web Service, or non-related to government.

All embodiments or According to some embodiments of allowing the continuation to serve a composite website, activation, or termination in a script within browser, web application, dialog, web app view, smart phone app, near-field communication, Bluetooth in low light or high light connection, QR-codes, biometrics.

All embodiments or According to some embodiments of allowing the continuation to serve a composite website, activation, or termination can be a dialog, web application, smart phone application, web app view, near-field communication, Bluetooth in low light or high light connection, QR-codes, biometrics, text messaging.

All embodiments or According to some embodiments for network protocols include but not limited to: transparently providing the application with the simultaneous use of multiple channels by multiplexing data from the application across a set of available channels by exposing a link layer through activation of DPI, dialog, user profile, vehicle object. Multiplexing Transport Protocol, Bandwidth Application Protocol, 33.6 Kbps POTS (IP), 128 Kbps ISDN, 384 Kbps ISDN, 10 Mbps LAN (IP).

All embodiments or According to some embodiments having an program to includes but not limited to instruct a user to go to the closer network router, reduce interface by other appliances, secure better connection find the best routing channel, in their location by using, Secure Web Browser, GPS, Cell Towers, the layout of ones property, configured in the user's profile or automatically. Also, instructions regarding the measurement of lighting.

All embodiments or According to some embodiments having a program to includes but not limited to a computer generated image of an optotype on a in any order of dialog, web app view, web application, application, on a separate computing device, on computing device, and on a microcontroller.

All embodiments or According to some embodiments includes but not limited to: website, dialog, web app view; web application, application, smart phone application in any order.

All embodiments or According to some embodiments includes but not limited to placards can be images on vehicles taken by a user, third party, separate entity computing device or any other device that allows to capture images.

All embodiments or According to some embodiments includes but not limited to placards being magnets on vehicles and objects. Also, using the images from an authentication captcha program or interface.

DETAILED DESCRIPTION

Figure 1:
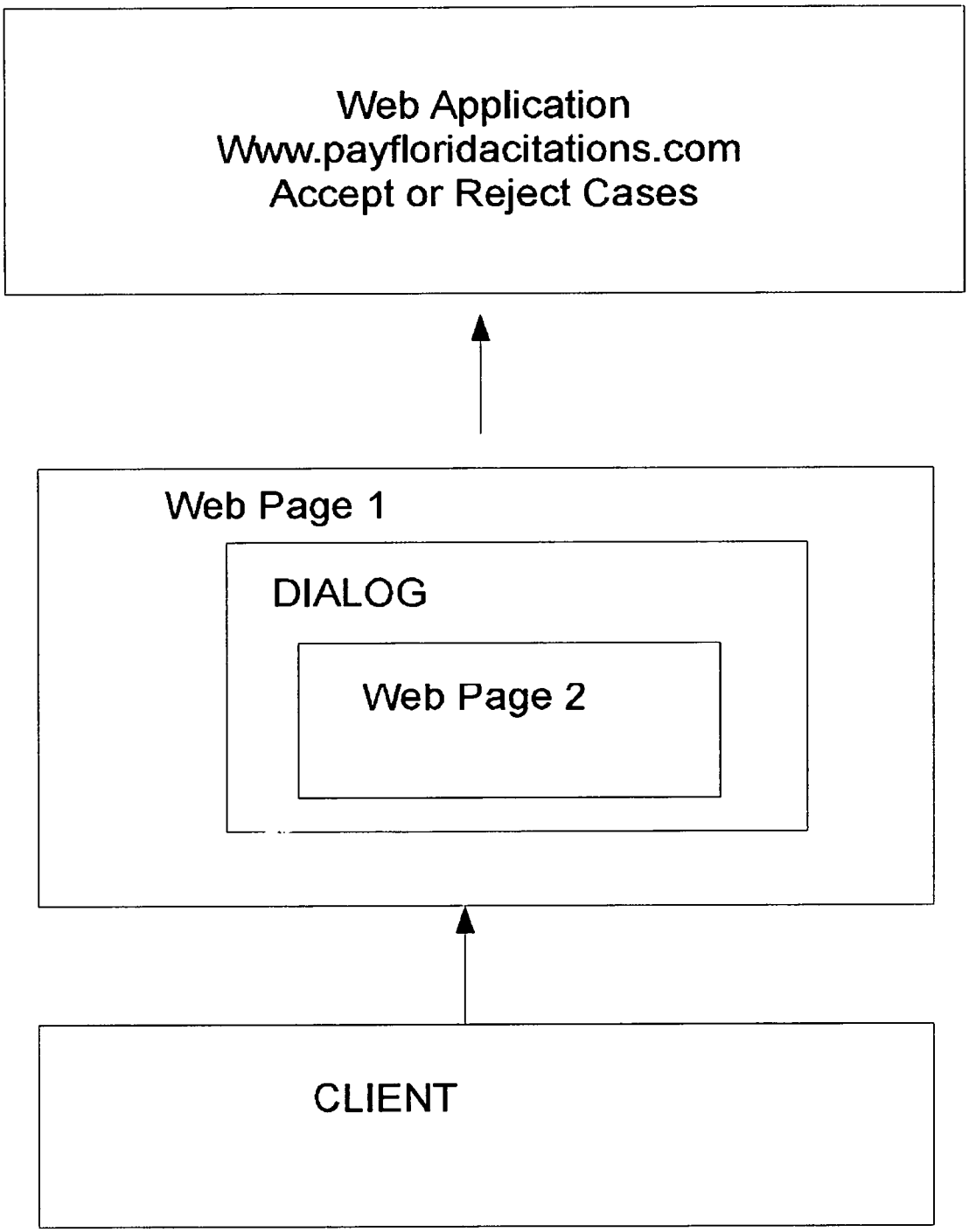
FIG. 1 represents a flowchart outlining relationships between web pages and dialogs in a web application implementation.
Figure 2:
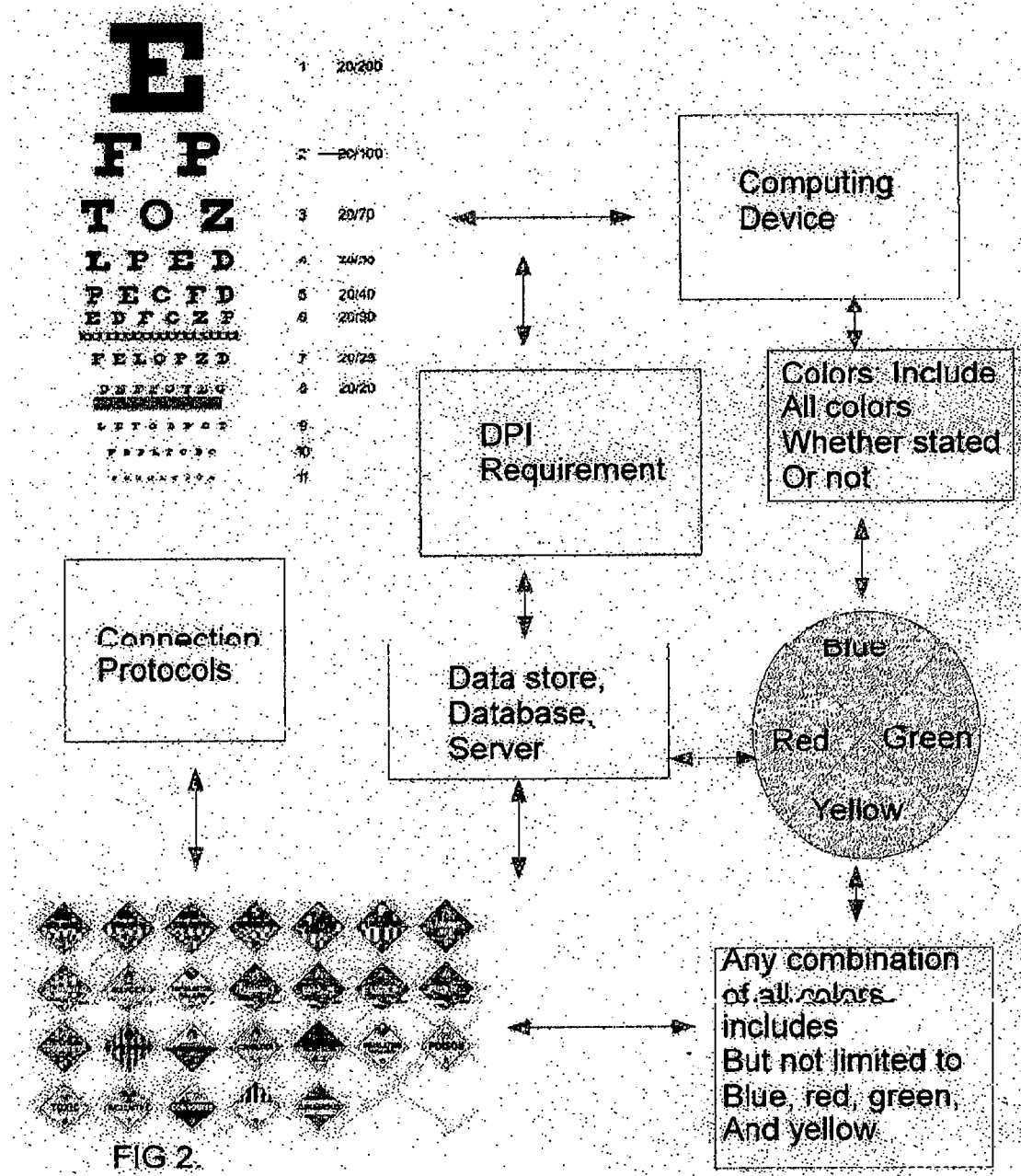
FIG. 2 outlines an example of an optional circumstance that a databases updates the dots per inch (DPI) requirement for submitted documentation to match a DPI requirement for submitted documentation in the agency assessing visual acuity using a video image of a optotype or Snellen chart obtained with the standard or non standard focal length and aperture of computing device.
Figure 3:
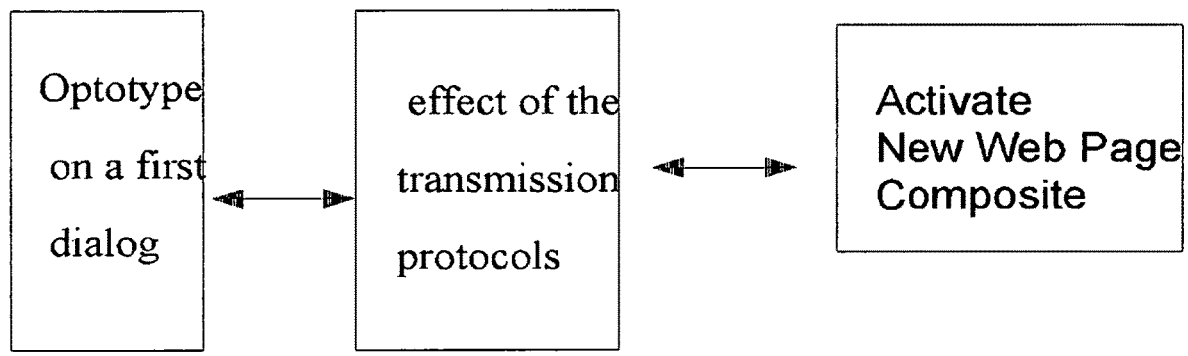
FIG. 3 compare the remote images transmitted using various bandwidths and connection protocols, computing device processes vehicle color placards from a data store, database, server, third party together or separately, computing device processes vehicle color placards from a data store and database; send color images via similar transmission bandwidths and connection protocols; compare hosted website images with remote images of the vehicle color placards to determine the effect of the transmission protocols on color fidelity and a computer generated image of an optotype on a first dialog.
Figure 4:
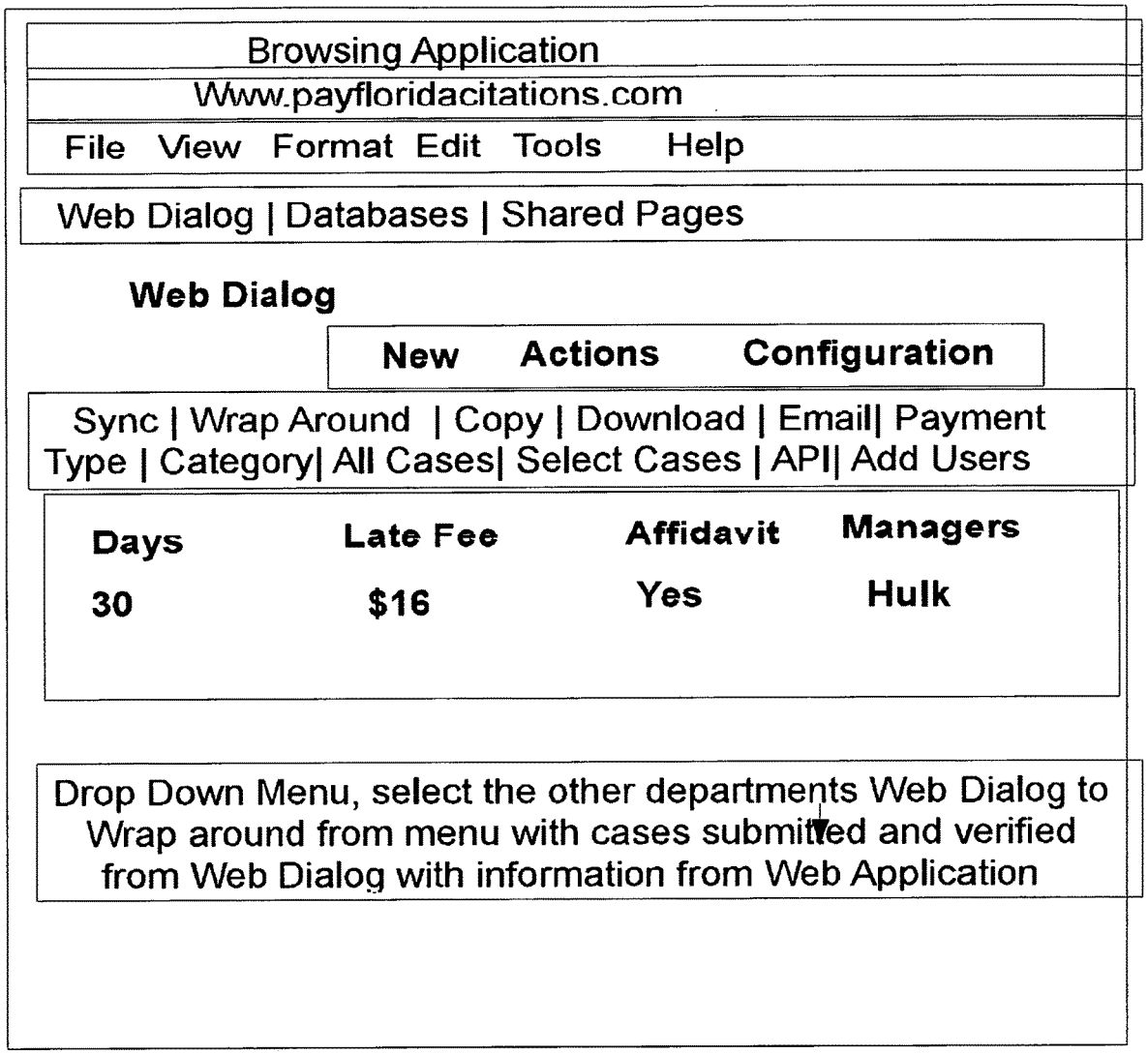
FIGS. 4A, 4B, 4C, 4D, and 4E shows the activation of a composite web page within a dialog or web app view or non-activation of a composite web page within a dialog or web app view FIG. 5 Shows the continuation or termination automatically of dialog, website, and new web site. Shows a new web page activated to serve a new composite web page to satisfy citation or vehicle safety requirements.
Figure 4:
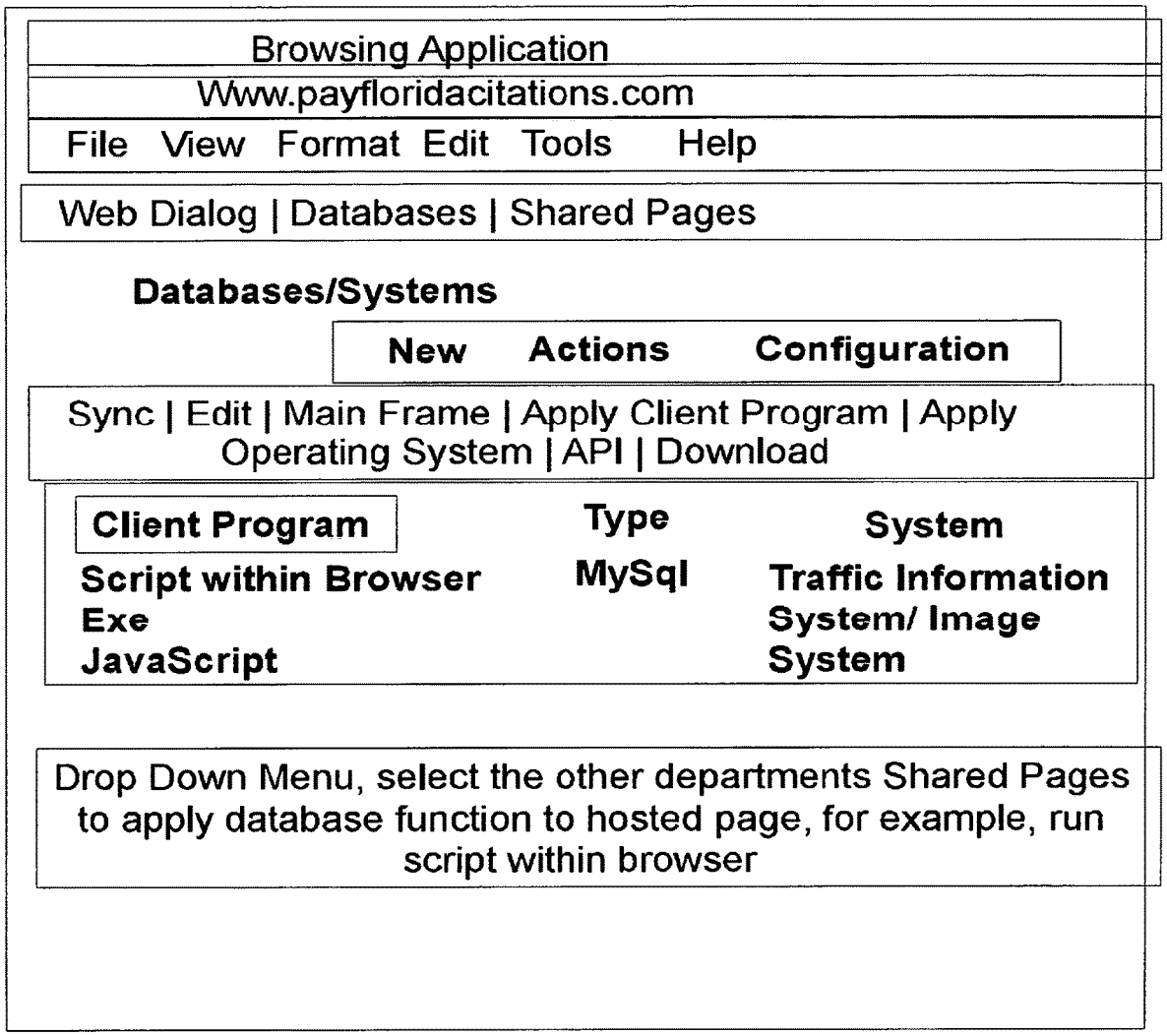
Figure 4:
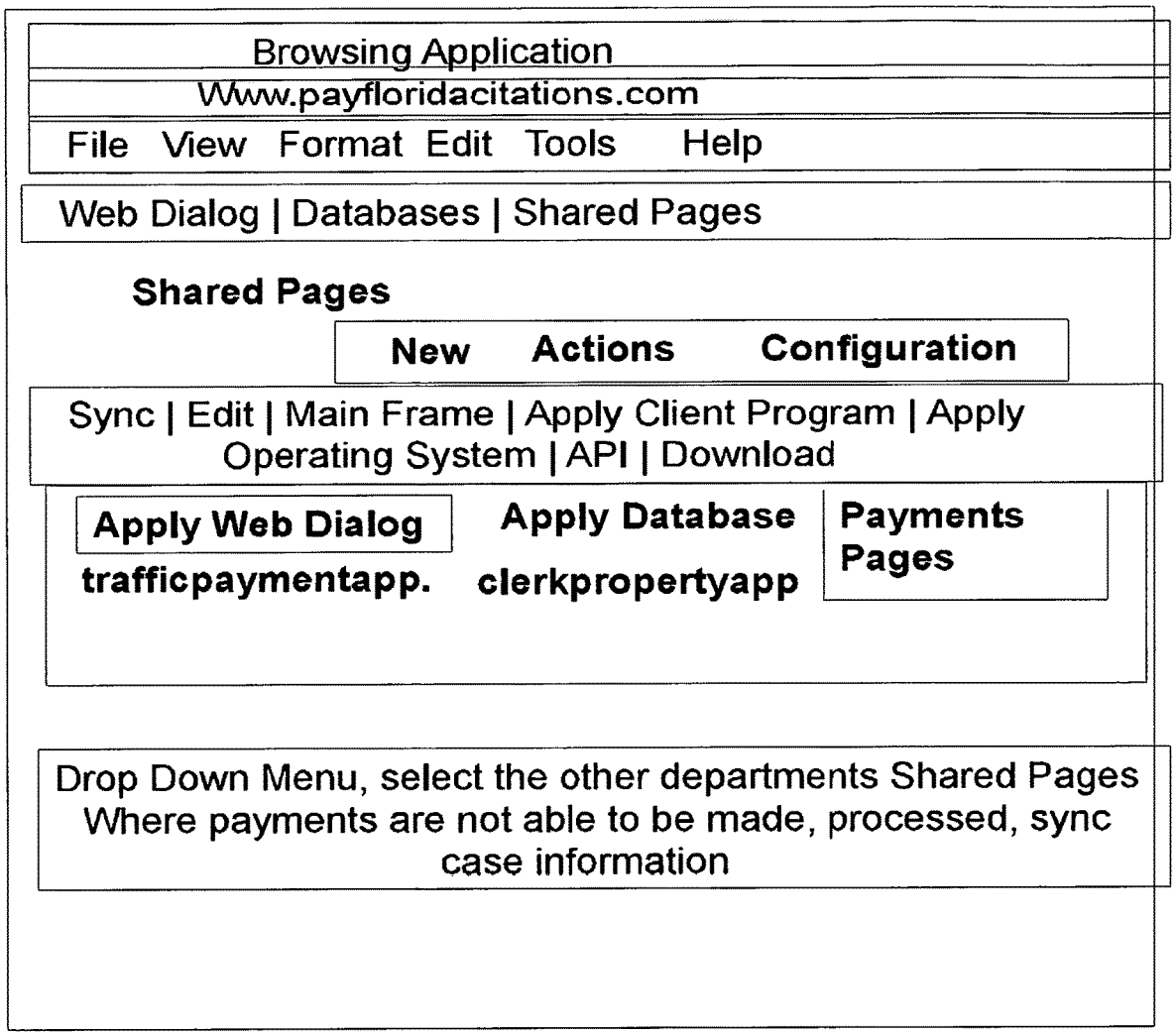
Figure 4:
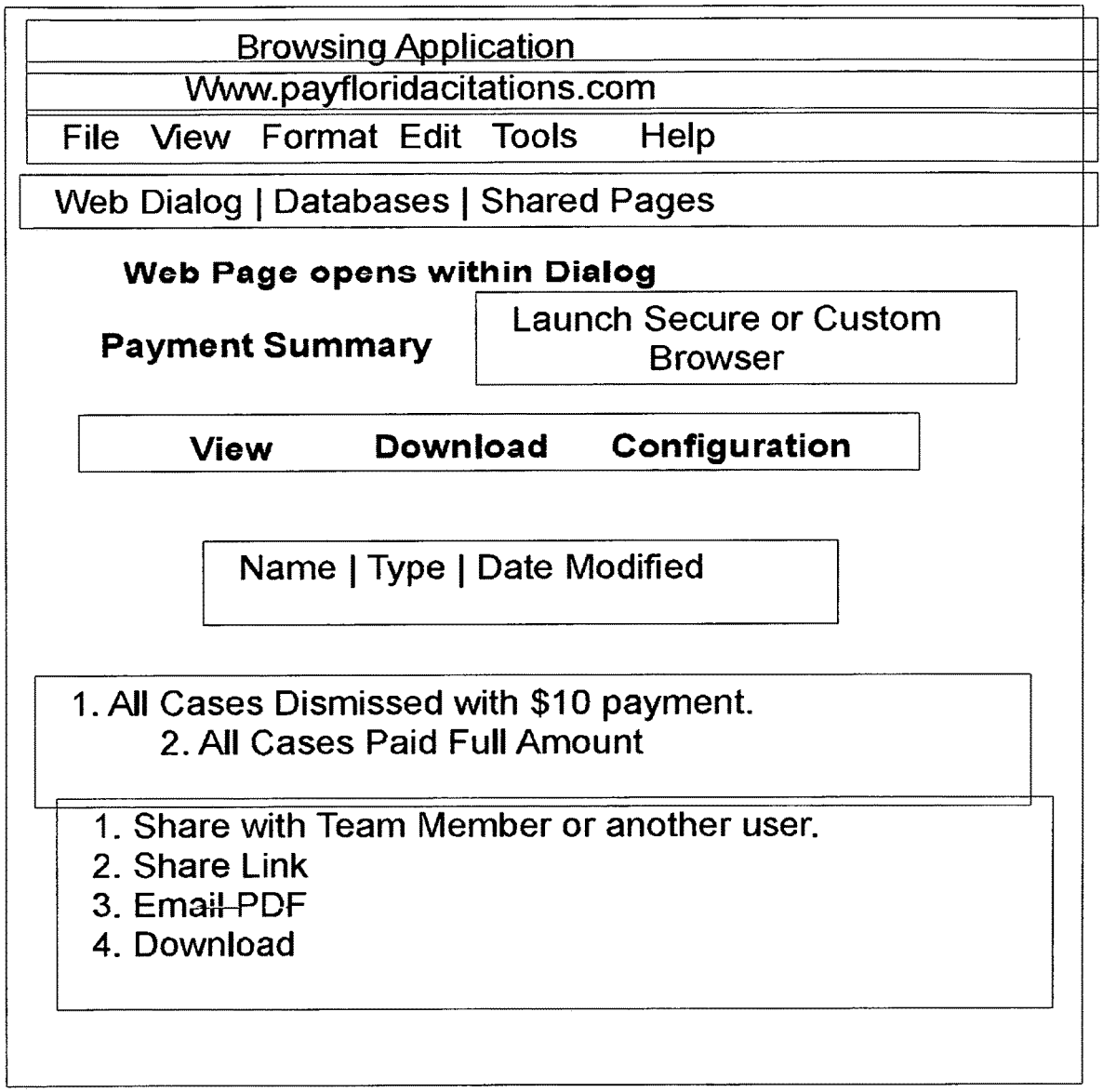
Figure 5:
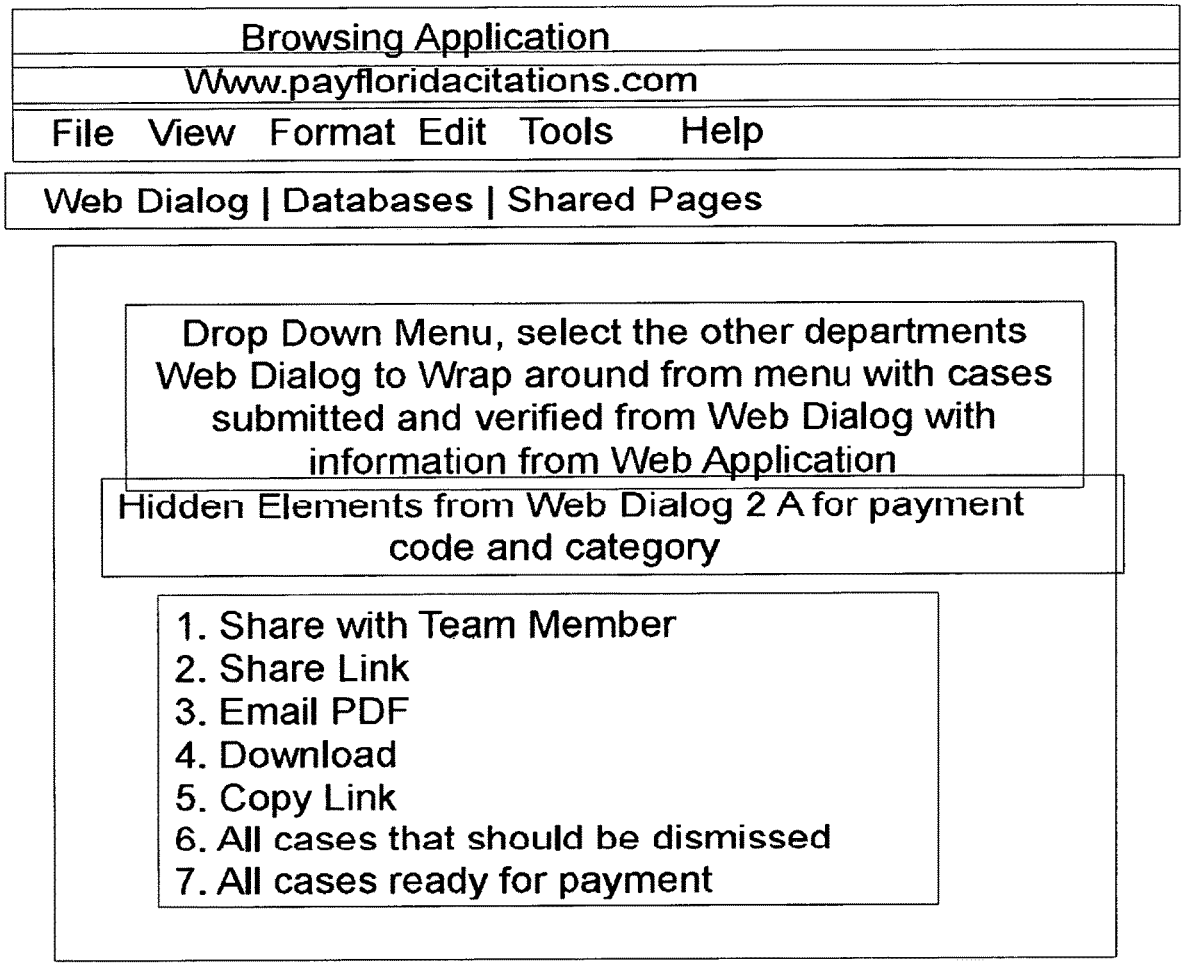

As briefly described above, web pages may be hosted with the contents of a vehicle documentary object with a dialog or a web app view hiding select elements of the hosted web page when in a dialog, implementing different behaviors for contents and hyperlinks inside or outside a dialog or a web app vies and inferring a size of a dialog or a web app view from its contents. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As described above, a cross-browser dialog platform that supports the location and enablement of sub-contents by hosting web pages in a dialog or web app view, such that a web page may be used inside or onside a dialog or web dialog to specifying separate behaviors for the links includes and to serve the compost of a new web page based on vehicle object with activation based on color placards through assessing visual acuity using a video image of a optotype chart obtained with the standard focal length and aperture of computing device and compare the remote images transmitted using various bandwidths and connection protocols.

What is claimed is:

1. A system for the submission and verification of documentary evidence to satisfy at least one outstanding citation comprising:
   a computing device comprising at least one processor and memory that contains instructions that are readable by the processor and cause the computing device to:
   receive a citation related to a user, including a communication address of the user and at least one violation;
   check a database coupled to the computing device for requirements associated with the at least one violation to satisfy the citation;
      synchronize the database with an agency database using at least one of JSON or Parcer to access an API of the agency database, wherein the database updates a dots per inch (DPI) requirement for submitted documentation to match a DPI requirement for submitted documentation in the agency database, wherein the agency database is associated with at least one of a state, city, or county;
      send a message containing the requirements associated with the violation to satisfy the citation and a current status of the citation;
   receive documentation required to satisfy the citation and update the current status, wherein the documentation is at least one of a driver's license, registration, insurance, or proof of compliant equipment;
   analyze the documentation to determine the DPI;
   compare the DPI of the documentation to the DPI requirement;
   determine the documentation does not comply with the DPI requirement, update the current status, and send an email to the user including a hyperlink and access code to enable the user to submit corrected documentation;
   receive corrected documentation;
   analyze the corrected documentation to determine the DPI;
   compare the DPI of the corrected documentation to the DPI requirement;
   determine the corrected documentation complies with the DPI requirement, update the current status, and mark the citation ready for review;
   analyze the corrected documentation to determine compliance with requirements associated with the at least one violation to satisfy the citation;
   determine the corrected documentation complies with the requirements associated with the at least one violation to satisfy the citation, update the current status indicating the citation is resolved.

* * * * *